(12) United States Patent
Shea et al.

(10) Patent No.: US 6,669,351 B1
(45) Date of Patent: Dec. 30, 2003

(54) AIRPORT IN-PAVEMENT LIGHTING FIXTURE

(75) Inventors: Kurt Shea, Agawam, MA (US);
Thomas Rampelli, Windsor Locks, CT (US); Paul Gongola, Enfield, CT (US); Todd Dubois, Broad Brook, CT (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 09/422,235

(22) Filed: Oct. 21, 1999

(51) Int. Cl.[7] .................................................. F01F 9/00
(52) U.S. Cl. ..................... 362/153.1; 362/267; 362/310
(58) Field of Search .............................. 362/153.1, 267, 362/310, 390; 220/327, 328, 377, 235, 236

(56) References Cited

U.S. PATENT DOCUMENTS

| | | | | | |
|---|---|---|---|---|---|
| 4,059,199 A | * | 11/1977 | Quaney | ...................... | 220/327 |
| 4,138,716 A | * | 2/1979 | Muhlethalar et al. | ........ | 362/375 |
| 4,331,832 A | * | 5/1982 | Curtis et al. | .................. | 220/3.7 |
| 5,230,437 A | * | 7/1993 | Kelly | .......................... | 220/237 |
| 5,560,706 A | * | 10/1996 | Yamazaki et al. | .......... | 362/267 |
| 5,676,448 A | * | 10/1997 | Urbaing | .................... | 362/153.1 |
| 5,765,942 A | * | 6/1998 | Shirai et al. | ................. | 362/267 |
| 6,113,245 A | * | 9/2000 | Reinert, Sr. | ............... | 362/153.1 |

OTHER PUBLICATIONS

Accurate Screw Machine Co. Catalog, pp. 160 and 176–178.

* cited by examiner

Primary Examiner—Thomas M. Sember

(57) ABSTRACT

An in-pavement airport lighting fixture includes a housing, a feed-through assembly, and a threaded bolt that extends through the housing to secure the housing to a base unit. The feed-through assembly carries a lamp and positions the lamp in the housing. The threaded bolt is coupled to the housing such that the housing is lifted by upward motion of the bolt as the bolt is disengaged from the base unit. The housing further includes at least one boss and the feed-through assembly includes a connector surrounding an upper portion of the feed-through assembly. The connector mates with an outer surface of the boss when the upper portion of the feed-through assembly is positioned against an inside surface of the boss.

18 Claims, 9 Drawing Sheets

AIRPORT IN-PAVEMENT LIGHTING FIXTURE

TECHNICAL FIELD

The invention relates to an airport in-pavement lighting fixture.

BACKGROUND

Light fixtures for airport runways and taxiways often are recessed into the pavement to delineate the outer boundaries of the runway or taxiway and to provide a visual indication of the location of the runway or taxiway. Such a light fixture installation typically includes a transformer, a base assembly and a light fixture. The base assembly is positioned in the pavement and holds the transformer. The light fixture is removably positioned within the base assembly. The light fixture may include an optical housing, a bottom cover, a lamp bracket assembly and a lamp. Typically, the optical housing and the bottom cover together define a watertight housing that contains the lamp bracket assembly and the lamp.

To replace a lamp that has burned out, the light fixture is removed from the base assembly using a special tool or set of tools. Then, an electrical connection between the transformer and the light fixture is disconnected. The light fixture then may be taken from the runway to the maintenance shop where the light fixture is disassembled by removing screws that retain the optical housing to the bottom cover to take the optical housing off of the bottom cover. With the bottom cover removed, the lamp is removed from the lamp bracket assembly in which it is positioned during use, and a new lamp is inserted. Next, the lamp assembly is reassembled in the reverse order, while ensuring that a gasket, which provides a seal between the bottom cover and the optical housing, is in good condition. The gasket must be replaced if it has deteriorated sufficiently that it will not provide a sufficient seal. After the light fixture is reassembled, it is reconnected to the transformer and repositioned in the base assembly.

SUMMARY

In one general aspect, an in-pavement airport lighting fixture includes a housing, a feed-through assembly for carrying a lamp and positioning the lamp in the housing, and a threaded bolt extending through the housing for securing the housing to a base unit. The threaded bolt is coupled to the housing such that the housing is lifted by upward motion of the bolt as the bolt is disengaged from the base unit. The housing further includes at least one boss and the feed-through assembly includes a connector surrounding an upper portion of the feed-through assembly. The connector mates with an outer surface of the boss when the upper portion of the feed-through assembly is positioned against an inside surface of the boss.

Embodiments may include one or more of the following features. For example, the housing may include an optical housing that mates with a bottom cover. The bottom cover includes a flange having a first mating surface that mates with a second mating surface of the optical housing. The first mating surface includes a groove having a gasket disposed in the groove. The gasket may be formed from an elastomer. The gasket may be bonded to the groove with an adhesive. The gasket may be configured to form a moisture barrier and a vibration damping mechanism when the first mating surface is mated to the second mating surface.

The housing may include an optical housing and a bottom cover formed as one piece.

The base unit may be mounted in the ground and include a transformer to supply power to the lamp. The base unit may be a retaining base or a mounting ring.

The in-pavement airport lighting fixture may further include at least one retaining clip and the bolt may include a head and a shaft that includes a bearing, with the retaining clip encircling the shaft. The housing may include at least one bolt hole such that the bolt passes through the bolt hole and the retaining clip encircles the shaft between the bearing and the head. The bearing may be positioned on the shaft between an upper portion and a lower portion of the shaft such that the retaining clip is inserted around the upper portion of the shaft.

The lower portion of the shaft may be threaded and the in-pavement airport lighting fixture may further include a retaining base having at least one threaded bolt hole. The threaded lower portion of the shaft may be threadably mated with the threaded bolt hole to mate the retaining base with the bottom cover.

The retaining clip may have an inner diameter less than an outer diameter of the bearing.

The boss may include at least one hole in the outer surface with a pin disposed in the hole. The connector may include a slot on an inside surface of the connector such that the pin is inserted into the slot when the connector is mated with the outer surface of the boss.

The in-pavement airport lighting fixture may further include second and third holes in the outer surface of the boss, second and third pins disposed in the second and third holes, and second and third slots in the inside surface of the connector. The second and third pins are inserted into the second and third slots when the connector is mated with the outer surface of the boss.

The boss may include an aligning pin protruding from the inner surface of the boss and the feed-through assembly may include an aligning slot. The aligning pin mates with the aligning slot when the connector is mated with the outer surface of the boss.

The slot may be aligned in a helical direction of the connector and may terminate at an opening passing through the connector. The pin passes through the slot and into the opening when the connector is mated with the outer surface of the boss.

In another general aspect, a method of installing an in-pavement airport lighting fixture includes providing an in-ground base unit, providing a housing, providing a feed-through assembly for carrying a lamp and positioning the lamp in the housing, and positioning the feed-through assembly in the housing. The housing includes at least one boss and the feed-through assembly includes a connector surrounding an upper portion of the feed-through assembly. The connector mates with an outer surface of the boss when the upper portion of the feed-through assembly is positioned against an inside surface of the boss.

Embodiments may include one or more of the following features. For example, the method may further include providing a threaded bolt, extending the threaded bolt through the housing, and securing the housing to the base unit. Securing the housing to the base unit includes engaging the threaded bolt to the base unit. The threaded bolt lifts the housing by upward motion of the bolt when disengaging the bolt from the base unit.

The method may further include providing a bottom cover, providing an optical housing, providing a gasket, and mating the bottom cover with the optical housing to form the housing. The bottom cover includes a flange having a first mating surface that mates with a second mating surface of the optical housing. The first mating surface includes a groove having the gasket disposed in the groove.

Another general aspect includes a method of changing a lamp in an in-pavement airport lighting fixture. The fixture includes an in-ground base unit, a housing, a threaded bolt extending through the housing to secure the housing to the in-ground base unit, and a feed-through assembly for carrying the lamp and positioning the lamp in the housing. The method includes disengaging the threaded bolt from the base unit. The threaded bolt lifts the housing by upward motion of the bolt when disengaging the bolt from the base unit.

Embodiments may include one or more of the following features. For example, the method may further include removing the feed-through assembly from the housing and replacing the lamp. The method may still further include positioning the feed-through assembly in the housing, extending the threaded bolt through the housing, and securing the housing to the base unit. Engaging the threaded bolt to the base unit secures the housing to the base unit.

The in-pavement runway light fixture provides considerable advantages, such as the ability to more easily perform maintenance on the fixture. For example, the bolts and retaining clips allow maintenance personnel to remove and install the bottom cover and optical housing without the use of special tools. Because the bolts and retaining clips remain attached to the bottom cover and optical housing when removed from the retaining base, there is little likelihood of losing the bolts and retaining clips.

Mounting the gasket in the groove in the flange eliminates the need to change the gasket every time the bottom cover is removed from the optical housing. This reduces the costs associated with labor and materials because the gasket must be replaced only when severely damaged. The gasket provides a moisture barrier and vibration damping, which improve the longevity of the light fixture.

The quick-disconnect, feed-through assembly reduces the time needed to replace faulty lamps because the assembly can be removed, and the lamp replaced, at the runway without the need to take the bottom cover and optical housing to a maintenance facility. The design of the feed-through assembly also provides the advantage that after reinstallation the lamp and reflector are aligned in the correct direction because of the mating of the keyed slot and pin.

Other features and advantages will be apparent from the following description, including the drawings, and from the claims.

DESCRIPTION

Figure 1:
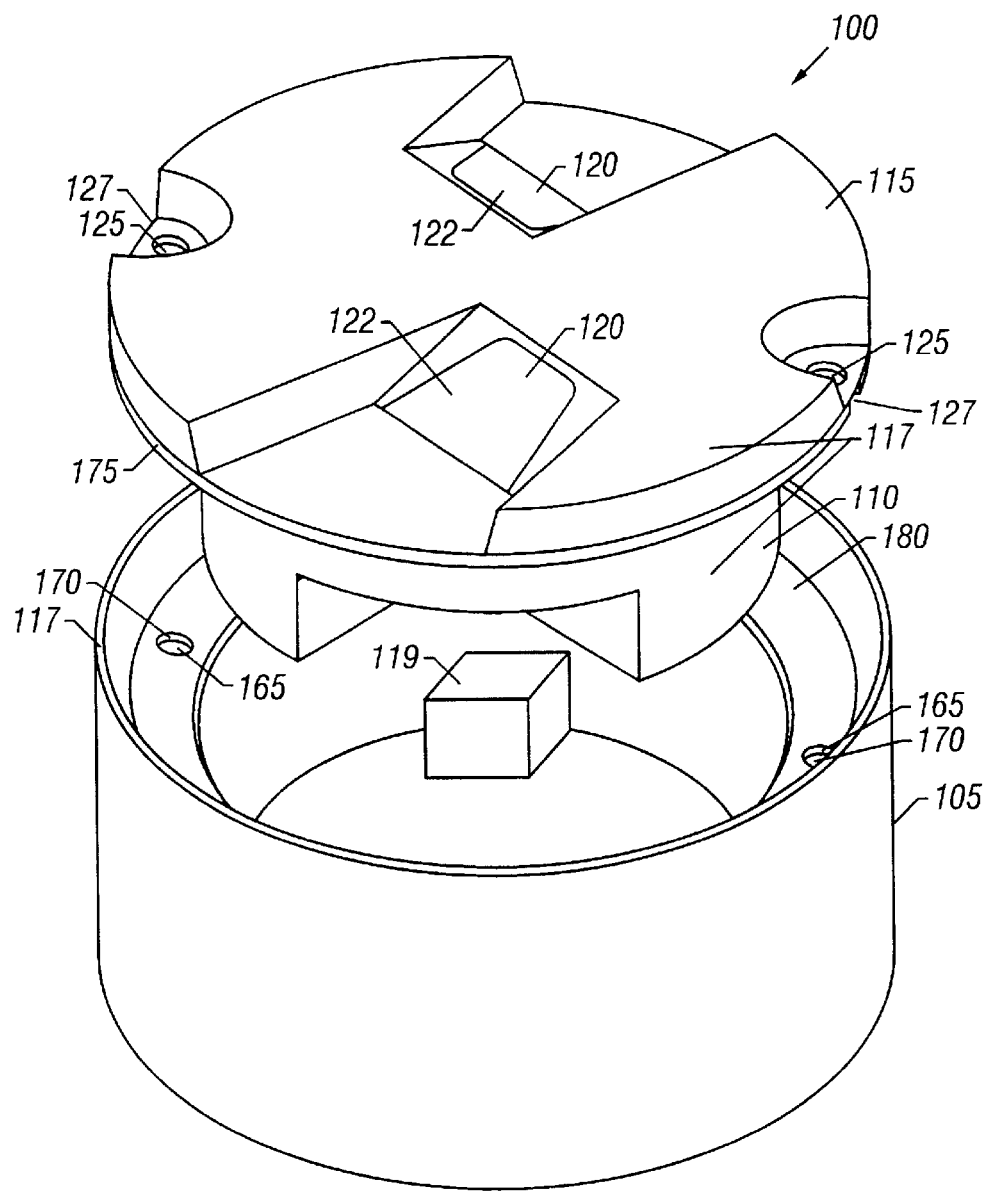
FIG. 1 is a perspective view of an airport in-pavement lighting fixture.

Referring to FIG. 1, an airport in-pavement lighting fixture 100 includes a retaining base 105, a bottom cover 110, and an optical housing 115. The bottom cover 110 and the optical housing 115 form an optical assembly 117. The retaining base 105 is recessed into the runway (not shown) and includes a transformer 119 that provides electrical power to the in-pavement lighting fixture 100. The optical housing includes at least one opening 120 through which light is directed. The opening 120 is angled with respect to a plane of the optical housing 115 so that light is directed in the direction of an approaching plane. If there are two openings 120, the individual openings are at opposite angles so that planes approaching the runway from either direction will see the light. Lenses 122 may be placed over the openings 120.

Figure 2:
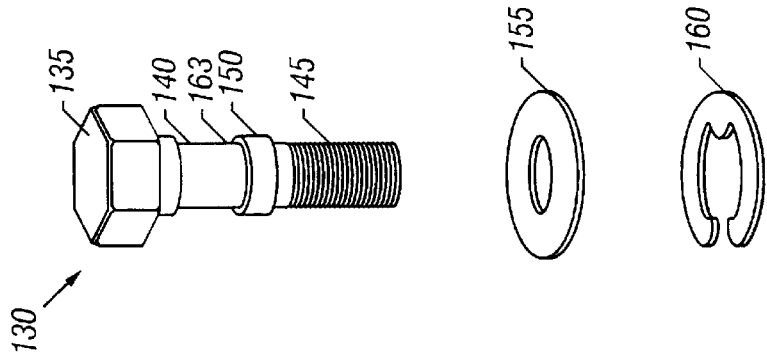
FIG. 2 is a perspective view of a bolt, a lockwasher and a retaining clip.

Referring also to FIG. 2, the optical housing 115 includes a pair of bolt holes 125 through which a pair of bolts 130 pass to secure the optical housing and the bottom cover 110, which includes a corresponding pair of bolt slots 127, to the retaining base 105. Each bolt 130 includes a head 135, a threadless shaft portion 140, a threaded shaft portion 145, and a bearing 150 between the threaded and threadless portions. The bolts 130 operate in conjunction with a lockwasher 155 and a retaining clip 160 to ease removal of the bottom cover 110 and the optical housing 115 (i.e., optical assembly 117) from the retaining base 105.

Figure 3:
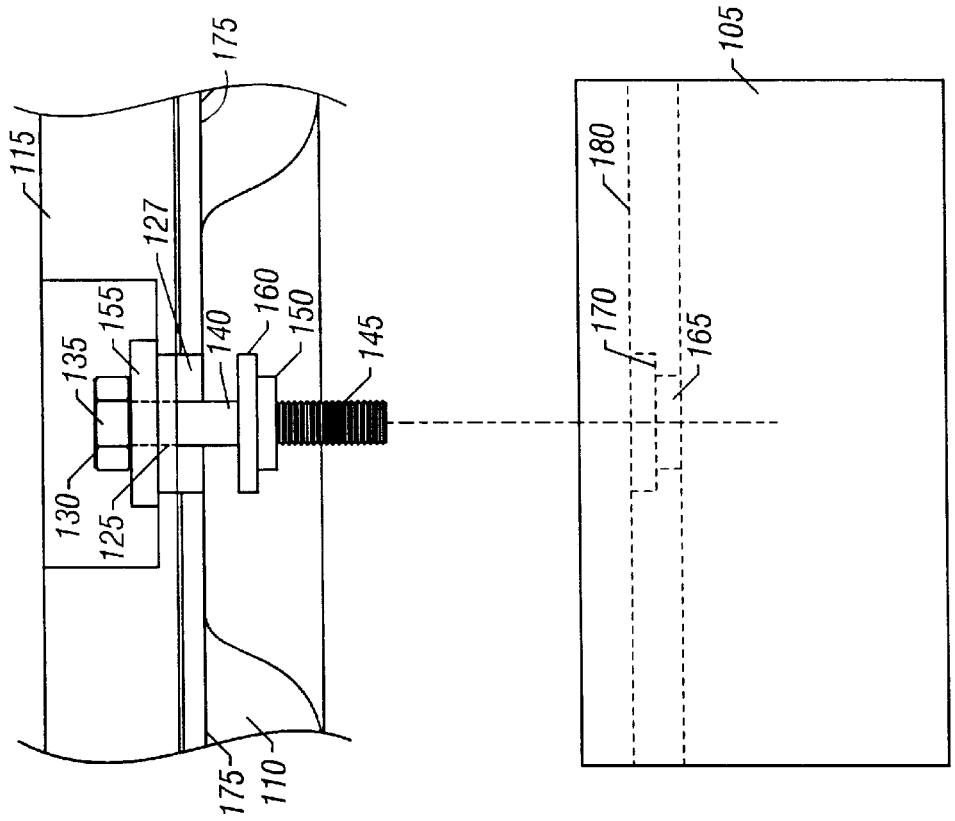
FIG. 3 is a side view of the mounting of a bottom cover and optical housing of the fixture of FIG. 1 to a retaining base of the fixture of FIG. 1 using the bolt and the retaining clip of FIG. 2.

Referring to FIG. 3, to secure the bottom cover 110 and the optical housing 115 to the retaining base, the threaded shaft portion 145, the bearing 150, and the threadless shaft portion 140 are passed through the lockwasher 155 so that the lockwasher is flush with the head 135 of the bolt. The bottom cover 110 and optical housing 115 are assembled so that the bolt holes 125 and bolt slots 127 are aligned, as illustrated in FIGS. 1 and 3. The bolt 130 then is inserted into one of the bolt holes 125 and through the corresponding bolt slot 127 until the lockwasher 155 is resting against the optical housing 115 and the head is resting against the lockwasher. The threaded shaft portion 145, bearing 150, and a lower portion 163 of the threadless shaft portion 140 will protrude through the underside of the bolt slot 127. The retaining clip 160 then is placed around the lower threadless shaft portion 163, between the bearing 150 and the bolt slot 127. This process is repeated for the other bolt 130. In this manner, the bolts 130 and lockwashers 155 are secured in the bolt holes 125.

Figure 4:
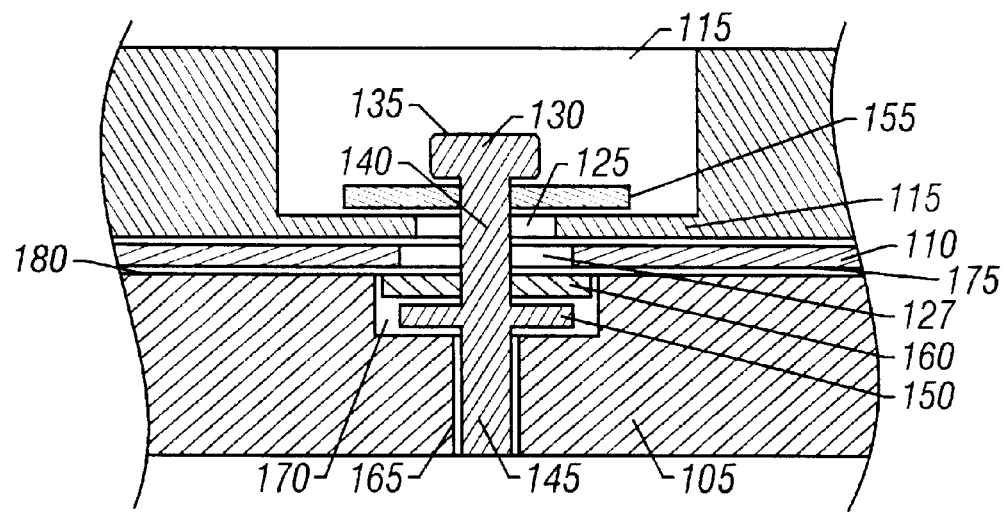
FIG. 4 is a cross-sectional side view of the bottom cover and the optical housing mounted in the retaining base using the bolt and the retaining clip.

Referring also to FIG. 4, the bolts 130 then are threaded into the threaded holes 165 in the retaining base 105 to mount the bottom cover 110 and optical housing 115 to the retaining base. The bearings 150 and retaining clips 160 are retained in recessed portions 170 of the retaining base 105 so that a bottom surface 175 of the bottom cover 110 is flush with a mating surface 180 of the retaining base. The recessed portions are deep enough to provide a secure fit while leaving gaps between the bearings 150 and the threaded holes 165.

Figure 5:
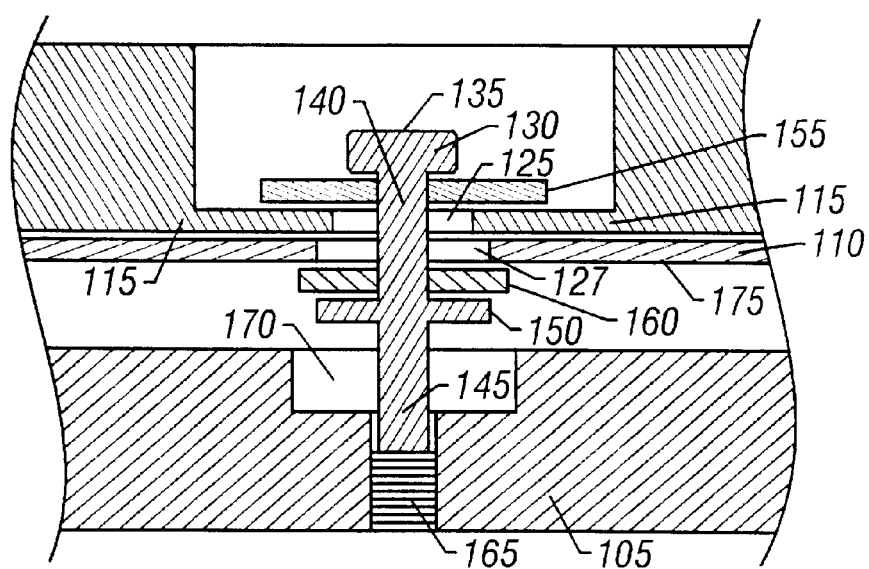
FIG. 5 is a cross-sectional side view of the bottom cover and the optical cover being removed from the retaining base using the bolt and the retaining clip.

Referring also to FIG. 5, to remove the bottom cover and optical housing, the bolts 130 are removed from the threaded holes 165. As the bolts are removed, the bearings 150 rise up and approach the bottom surface 175 of the bottom cover 110. This causes the bearings to contact the retaining clips 160 and to push the retaining clips against the bottom surface 175. Once the retaining clips contact the bottom surface 175, further retraction of the bolts 130 raises the bottom cover 110 away from the retaining base 105, which permits edges of the bottom cover and optical housing to be gripped. Thus, when the threaded shaft portion 145 is no longer engaged with the threaded holes 165, the bottom cover and optical housing are easily lifted as one unit away (i.e., the optical assembly 117) from the retaining base 105.

Figure 6:
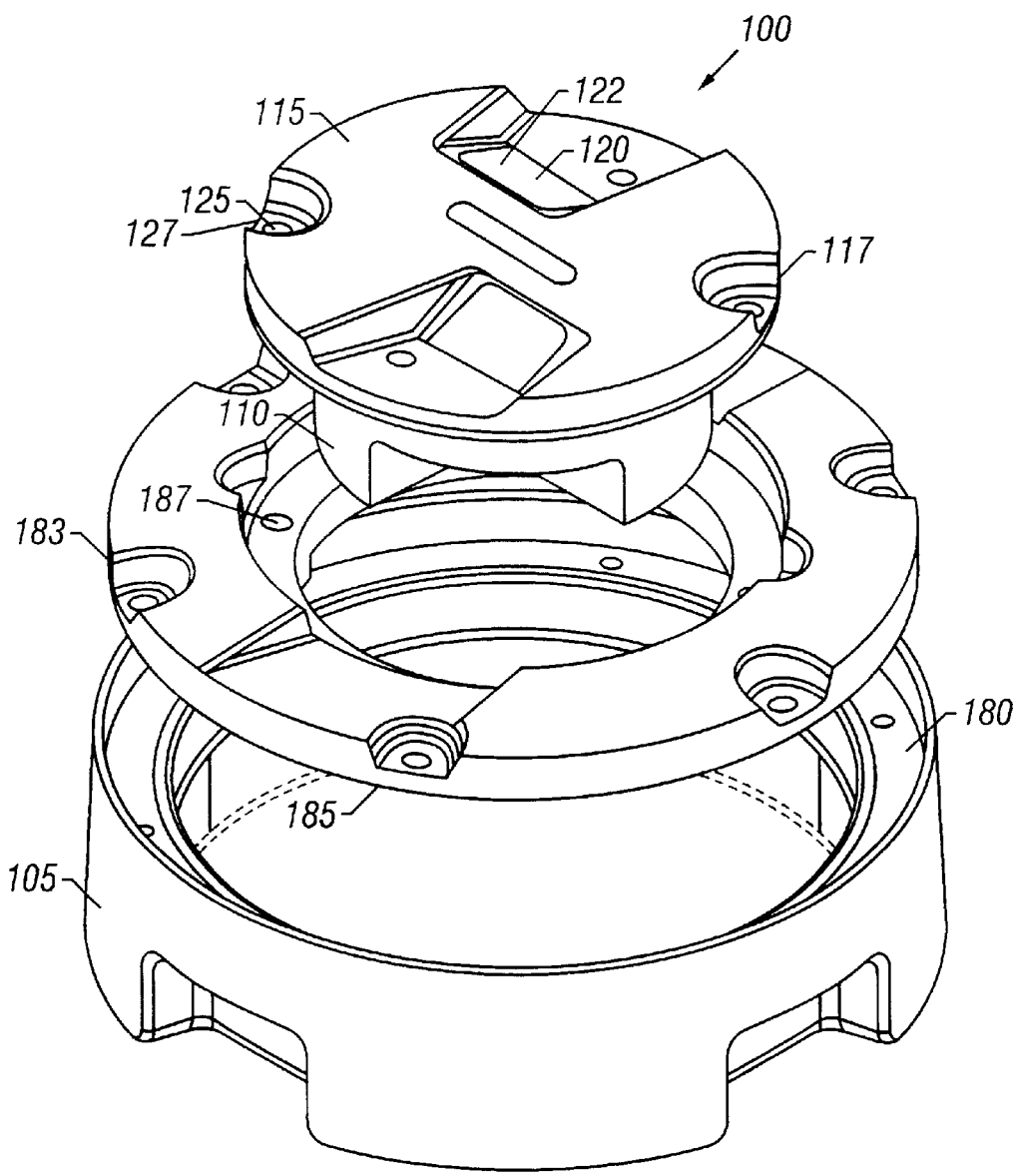
FIG. 6 is a perspective view of an airport in-pavement lighting fixture using a mounting flange to mount an optical assembly to the retaining base.

Referring to FIG. 6, a mounting ring 183 is positioned between the bottom cover 110 and the retaining base 105. The mounting ring 183 includes a lower surface 185 that mates with mating surface 180 of retaining base 105 when mounting ring 183 is seated and installed in retaining base 105. Mounting ring 183 also includes threaded holes 187, which are similar to threaded holes 165 and are used to mount the bottom cover 110 and optical assembly 115 to the mounting ring 183. Bolts 130 (see FIGS. 2–5) are threaded into the threaded holes 187 such that, in conjunction with lockwashers 155 and retaining clips 160, as described above with reference to FIGS. 1–5, the optical assembly 117 can be removed. Mounting ring 183 may be used, for example, to install optical assemblies 117 into retaining bases 105 that have shallow, larger diameter profiles.

Figure 7:
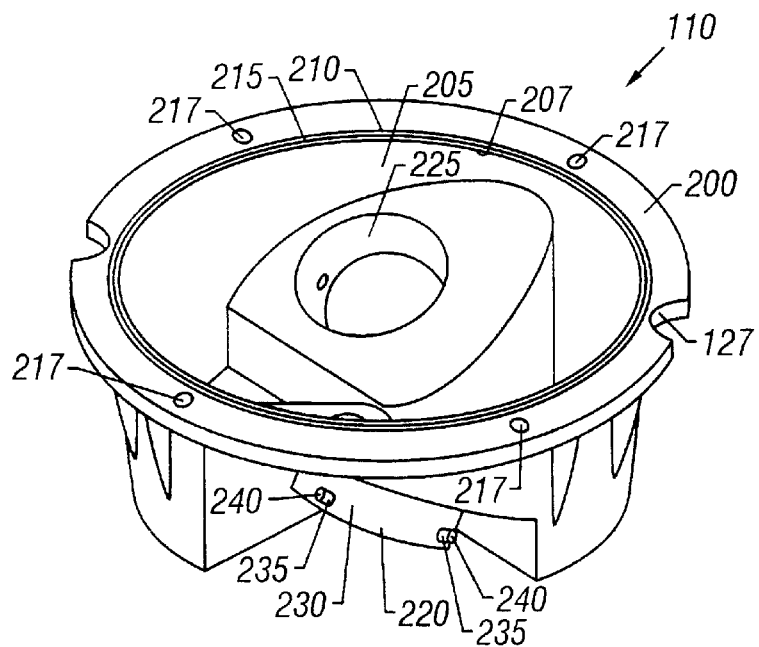
FIGS. 7–9 are perspective, side, and cross-section side views, respectively, of the bottom cover.
Figure 8:
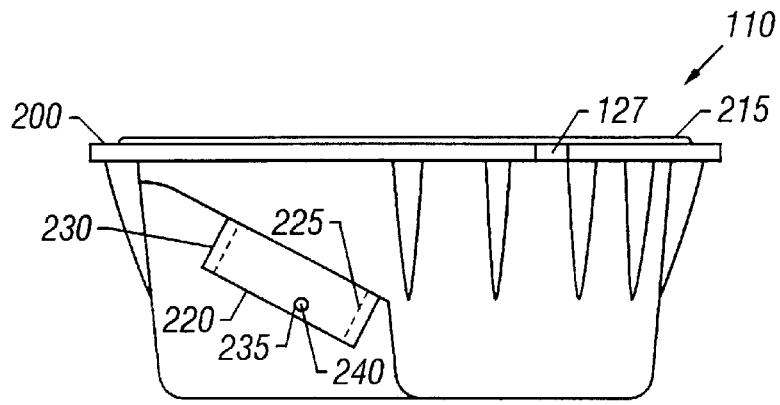
Figure 9:
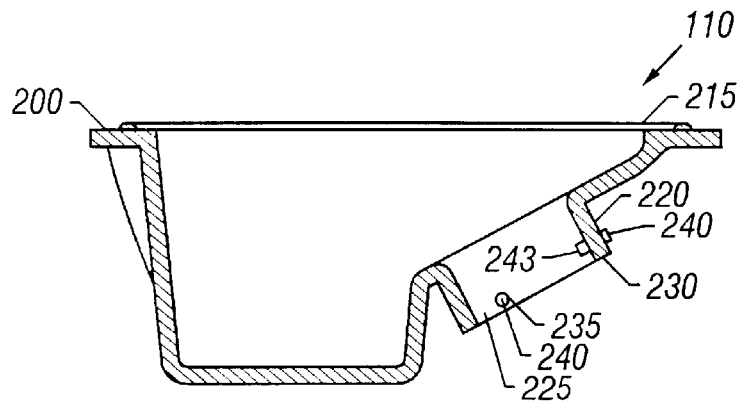
Figure 10:
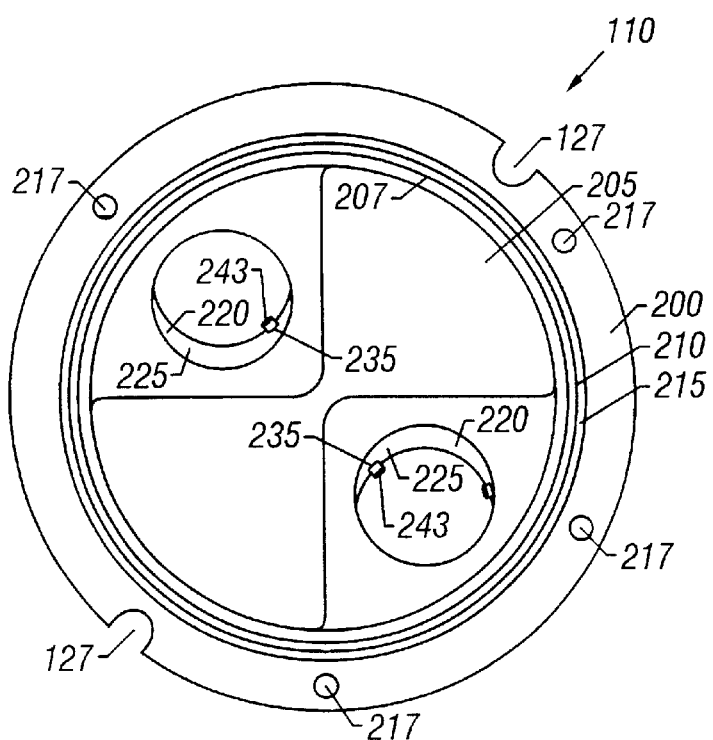
FIGS. 10 and 11 are top and bottom views, respectively, of the bottom cover.
Figure 11:
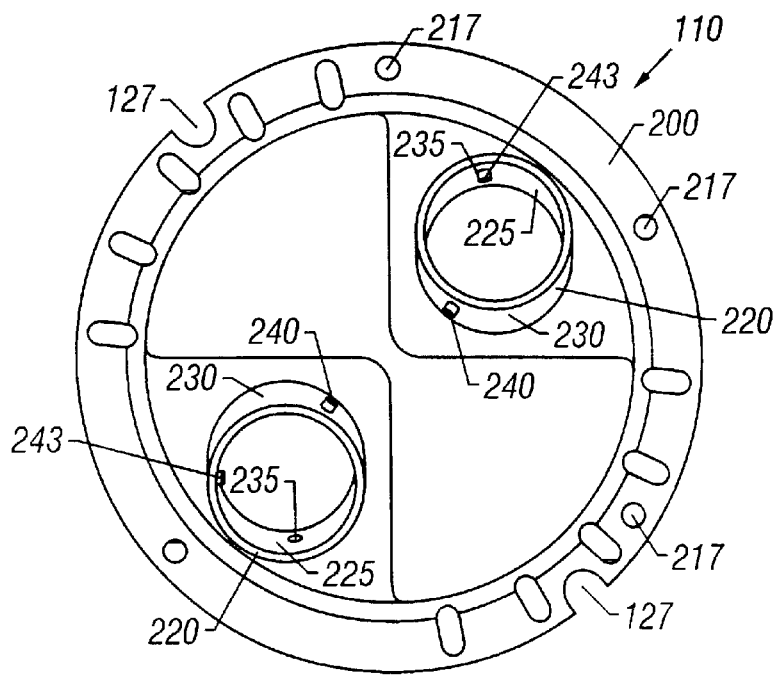
Figure 12:
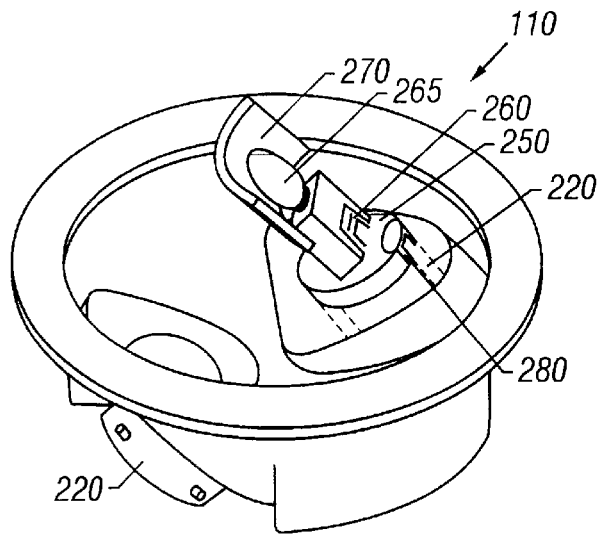
FIG. 12 is a perspective view of the bottom cover with an inserted quick-disconnect, feed-through assembly.
Figure 13:
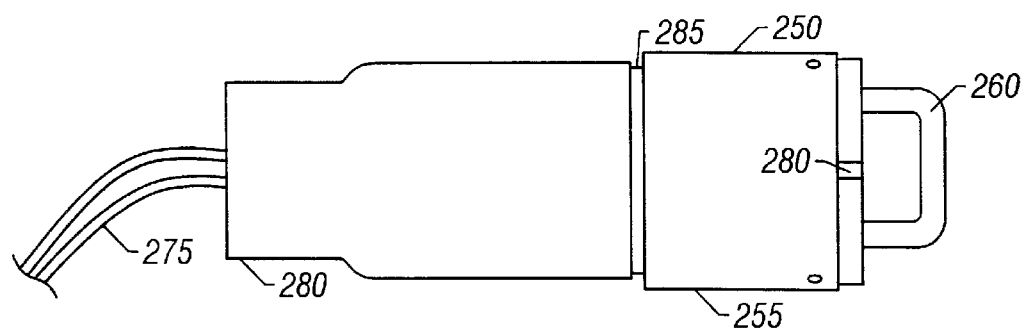
FIGS. 13 and 14 are side and cross-section side views of the quick-disconnect, feed-through assembly of FIG. 12.
Figure 14:
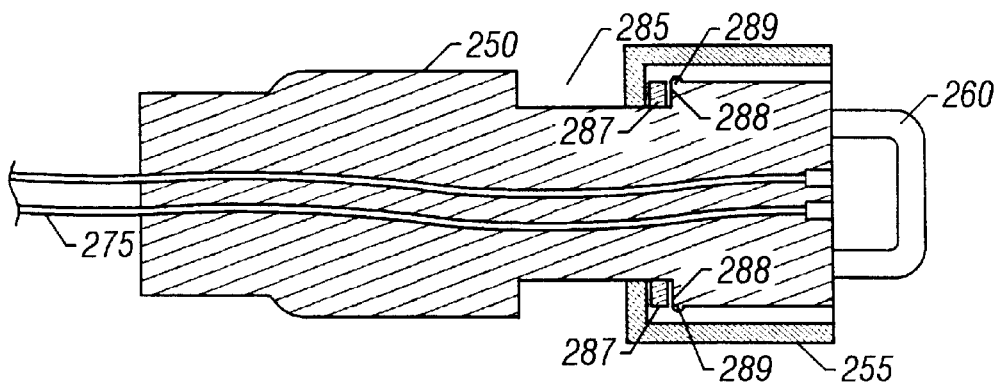
Figure 15:
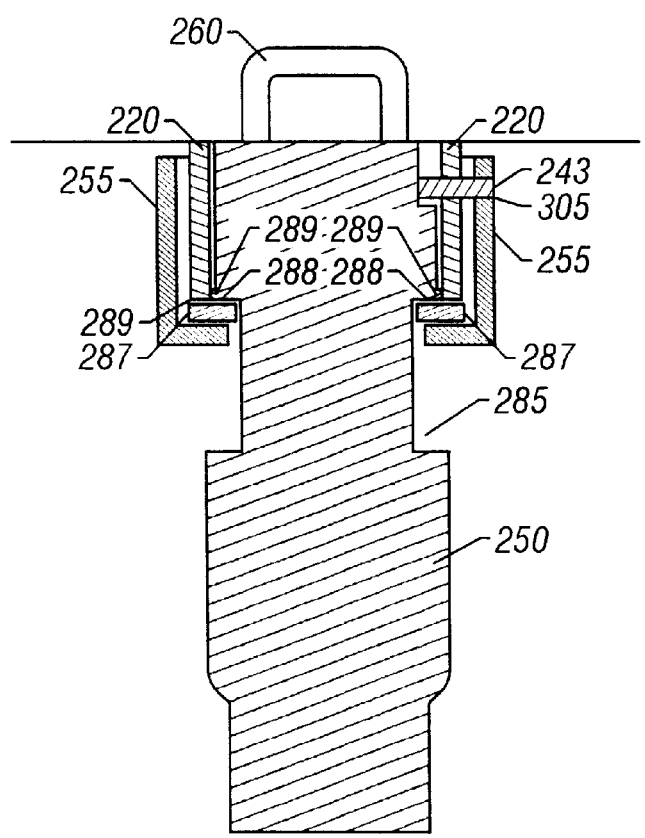
FIG. 15 is a cross-sectional side view of the quick-disconnect, feed-through assembly mounted in the bottom cover.
Figure 16:
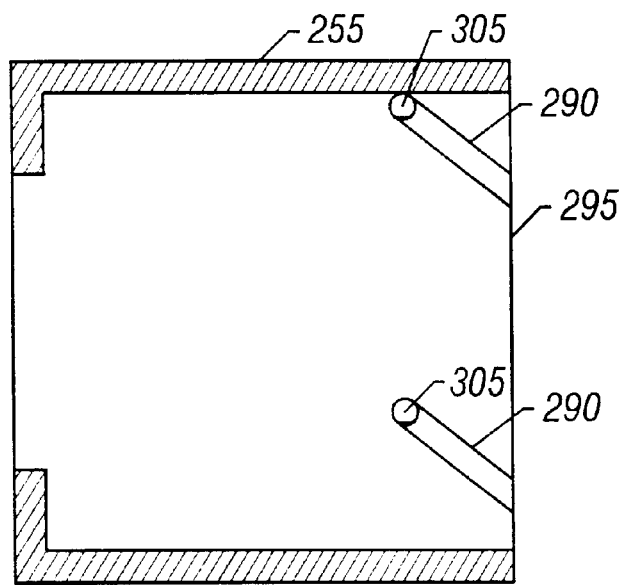
FIGS. 16 and 17 are cross-sectional side and top views, respectively, of the quick-disconnect, feed-through assembly of FIG. 13.
Figure 17:
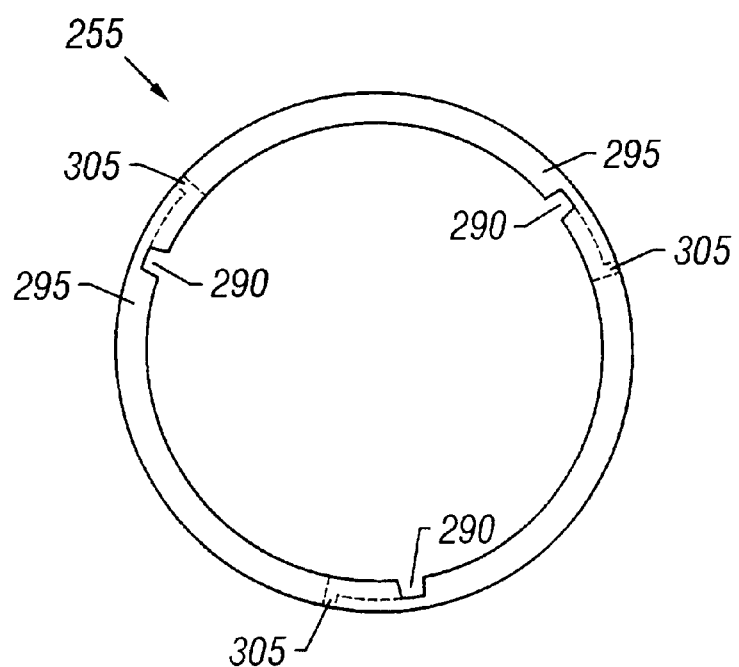

Referring to FIG. 7, the bottom cover 110 includes a flange 200 encircling the circumference of an opening 205. An inner diameter 207 of the flange 200 includes a groove 210 recessed into the flange, and into which an elastomeric gasket 215 is positioned. The bottom cover 110 is a metal piece that is die cast and anodized, and may be made, for example, from aluminum or a zinc-aluminum alloy. The gasket may be made of a silicon rubber elastomer, the composition of which is well-known in the art.

The gasket 215 is placed within the groove 210 and bonded with an adhesive to the inside surface of the groove. The gasket 215 forms a moisture seal between the bottom cover 110 and the optical housing 115. The gasket 215 also provides vibration damping for the in-pavement lighting fixture 100 that occurs as airplanes land on the runway or taxi down the taxiway. When the gasket is bonded to the groove 210, it becomes integral to the flange 200 such that the optical housing 115 may be removed multiple times from the bottom cover 110 without affecting the position of the gasket and the resulting moisture seal. If the ability of the gasket 215 to provide a moisture seal is severely diminished, it can be replaced with a new gasket 215 by removing the old gasket and bonding the new gasket to the bottom cover 110 in the groove 210. The bottom cover also includes holes 217 passing through flange 200. The holes are aligned with corresponding openings (not shown) in the base of the optical housing 115 when the bottom cover 110 is mounted to the optical housing 115. Screws pass through the holes 217 to securely attach the bottom cover to the optical housing to provide the moisture seal.

Referring also to FIGS. 8–11, the bottom cover 110 includes a pair of bosses 220 having inner surfaces 225 and outer surfaces 230. On each boss 220, three holes 235 pass from the inner surface 225 to the outer surface 230. A pin 240 is press-fit into each hole 235 such that it protrudes beyond the outer surface 230 of each boss 220. One of the pins 240 also may protrude beyond the inner surface 225 to form an aligning pin 243.

Referring also to FIGS. 12–17, a quick-disconnect, feed-through assembly 250 is positioned in one of the bosses 220. (In an actual implementation, an assembly 250 would be positioned in each boss 220. However, for ease of illustration, only one assembly 250 is shown.) The feed-through assembly includes a quick-lock connector 255, a lamp base 260, a lamp bulb 265, and a reflector 270. Wires 275 pass from a base 280 of the feed-through assembly to the transformer 119 mounted in the retaining base 105. The wires may be connected directly to the transformer, or by a separable plug. The feed-through assembly 250 also includes an aligning slot 280 that mates with the aligning pin 243 to align the assembly with the boss. The connector 255 may be a standard military circular connector. An interference fit between the feed-through assembly 250 and the inner surface of the boss 220 helps to provide a moisture barrier between them.

The feed-through assembly 250 is molded in a two-step molding process such that the connector 255 turns freely within a groove 285 in the assembly 250, but is also retained within the groove. A wave washer 287 is positioned between the connector 250 and an upper edge 288 of the groove 285. A flange 289 adjacent to the upper edge 288 is integral with the assembly 250 and is formed during the injection molding process.

The connector 255 includes three helical slots 290 that open at an upper lip 295 of the connector. The helical slots 290 terminate at openings 305. The slots 290 and openings 305 mate with the pins 240 that protrude beyond the outer surface 220 when the connector is forced towards the upper edge 288, such that the connector 255 forms a moisture-tight seal with edge 288 and integral flange 289. The wave washer 287 is compressed into a flat shape when the connector 255 forms the seal and ensures that the connector remains in place.

To change a faulty lamp bulb 265, a service person removes the bottom cover 110 and optical housing 115 from the retaining base 105, as described above, by loosening the bolts 130, and then lifting the cover 110 and housing 115 as a single unit (i.e., the optical assembly). The service person then turns the quick-lock connector 255 approximately ⅓ of a full turn and pulls it back from the bottom cover 110, which moves the pins 240 out of the openings 305, and through the helical slots 290. The feed-through assembly 250 then may be pulled out of the boss 220 and the lamp bulb 265 replaced.

With the bottom cover 110 and optical housing 115 removed from the retaining base 105, lens 122 may be replaced if damaged, which requires removing the cover 110 from the housing 115. At this time, the gasket 215 may be examined to determine if it will provide an adequate seal when the bottom cover 110 and optical housing 115 are reattached. If it will not provide an adequate seal, the gasket 215 may be replaced as described above before the feed-through assembly 250 is re-inserted into the boss 220.

To re-insert the feed-through assembly 250 into the boss 220, the aligning slot 280 is first aligned with the aligning pin 243, which protrudes beyond the inner surface 225. This alignment ensures that the lamp bulb 265 and reflector 270 are oriented in the same direction in which they were oriented before the bulb 265 was replaced. The assembly 250 then is pushed into the boss 220 such that the aligning pin 243 is mated with the aligning slot 280.

The helical slots 290 then are aligned with the pins 240 protruding beyond the outer surface 230, the connector 255 is pushed toward the bottom cover 110 and the connector 255 is turned approximately ⅓ of a full turn, which moves the pins 240 into the openings 305. The bottom cover 110 and optical housing 115 then may be replaced in the retaining base 105 as described above.

Other embodiments are within the scope of the following claims. For example, the optical housing may have a groove in which a gasket is inserted to provide a moisture barrier when the optical housing and bottom cover are mated. The bottom cover may have a second groove in which a second gasket is inserted to provide an additional moisture barrier and more vibration damping. In addition, the bottom cover and optical housing may be molded as one piece.

What is claimed is:

1. An in-pavement airport lighting fixture comprising:
    an optical housing;
    a bottom cover that includes a flange having a first mating surface that is configured to mate with a second mating surface of the optical housing, a groove in the first mating surface, and a gasket disposed in the groove;
    a base unit;
    a threaded bolt extending through the optical housing and the bottom cover for removably mounting the optical housing and the bottom cover to the base unit; and
    a retaining clip attached to the threaded bolt such that the retaining clip exerts an upward force on the bottom cover or optical housing as the bolt is disengaged from the base unit, the upward force lifting the optical housing and the bottom cover.

2. The in-pavement airport lighting fixture of claim 1, wherein the gasket is formed from an elastomer.

3. The in-pavement airport lighting fixture of claim 1, wherein the gasket is bonded to the groove with an adhesive.

4. The in-pavement airport lighting fixture of claim 1, wherein the gasket is configured to form a moisture barrier when the first mating surface is mated to the second mating surface.

5. The in-pavement airport lighting fixture of claim 1, wherein the gasket is configured to form a vibration damping mechanism when the first mating surface is mated to the second mating surface.

6. The in-pavement airport lighting fixture of claim 1, further comprising:
    a housing that includes the optical housing and the bottom cover; and
    a feed-through assembly for carrying a lamp and positioning the lamp in the housing;
    wherein the bottom cover includes at least one boss and the feed-through assembly includes a connector surrounding an upper portion of the feed-through assembly, the connector being configured to mate with an outer surface of the boss when the upper portion of the feed-through assembly is positioned against an inside surface of the boss.

7. The in-pavement airport lighting fixture of claim 6, wherein the boss includes at least one hole in the outer surface and a pin is disposed in the hole, and the connector includes a slot on an inside surface of the connector, wherein the pin is configured to be inserted into the slot when the connector is mated with the outer surface of the boss.

8. The in-pavement airport lighting fixture of claim 7, further comprising:
    second and third holes in the outer surface of the boss;
    second and third pins disposed in the second and third holes; and
    second and third slots in the inside surface of the connector,
    wherein the second and third pins are configured to be inserted into the second and third slots when the connector is mated with the outer surface of the boss.

9. The in-pavement airport lighting fixture of claim 7, wherein the slot is aligned in a helical direction of the connector and terminates at an opening passing through the connector, and the pin is configured to pass through the slot and into the opening when the connector is mated with the outer surface of the boss.

10. The in-pavement airport lighting fixture of claim 6, wherein the boss includes an aligning pin protruding from the inner surface of the boss, the feed-through assembly includes an aligning slot, and the aligning pin is configured to mate with the aligning slot when the connector is mated with the outer surface of the boss.

11. The in-pavement airport lighting fixture of claim 6, wherein the base unit is mounted in the ground and includes a transformer to supply power to the lamp.

12. The in-pavement airport lighting fixture of claim 1, wherein:
    the bolt includes a head and a shaft that includes a bearing;
    the retaining clip is configured to encircle the shaft;
    the housing includes at least one bolt hole;
    the bolt passes through the bolt hole; and
    the retaining clip encircles the shaft between the bearing and the head.

13. The in-pavement airport lighting fixture of claim 12, wherein the bearing is disposed on the shaft between an upper portion and a lower portion of the shaft, and the retaining clip is inserted around the upper portion.

14. The in-pavement airport lighting fixture of claim 13, wherein the lower portion of the shaft is threaded.

15. The in-pavement airport lighting fixture of claim 14, wherein the base unit includes at least one threaded bolt hole and wherein the threaded lower portion of the shaft is configured to be threadably mated with the threaded bolt hole to mate the base unit with the housing.

16. The in-pavement airport lighting fixture of claim 15, wherein the base unit is a retaining base.

17. The in-pavement airport lighting fixture of claim 15, wherein the base unit is a mounting ring.

18. The in-pavement airport lighting fixture of claim 12, wherein the retaining clip has an inner diameter less than an outer diameter of the bearing.

* * * * *